US009595721B2

(12) United States Patent
Hirai et al.

(10) Patent No.: US 9,595,721 B2
(45) Date of Patent: Mar. 14, 2017

(54) STACKING SYSTEM

(71) Applicants: Kenichi Hirai, Ueda (JP); Seiji Yamaura, Ueda (JP)

(72) Inventors: Kenichi Hirai, Ueda (JP); Seiji Yamaura, Ueda (JP)

(73) Assignee: NAGANO AUTOMATION CO., LTD., Ueda-Shi, Nagano (JP)

( * ) Notice: Subject to any disclaimer, the term of this patent is extended or adjusted under 35 U.S.C. 154(b) by 465 days.

(21) Appl. No.: 14/125,874

(22) PCT Filed: Feb. 20, 2013

(86) PCT No.: PCT/JP2013/000955
§ 371 (c)(1),
(2) Date: Dec. 12, 2013

(87) PCT Pub. No.: WO2013/125219
PCT Pub. Date: Aug. 29, 2013

(65) Prior Publication Data
US 2014/0109396 A1  Apr. 24, 2014

(30) Foreign Application Priority Data
Feb. 20, 2012  (JP) ................................. 2012-034237

(51) Int. Cl.
H01M 6/00 (2006.01)
B32B 37/16 (2006.01)
(Continued)

(52) U.S. Cl.
CPC ............. H01M 6/005 (2013.01); B32B 37/16 (2013.01); B32B 39/00 (2013.01);
(Continued)

(58) Field of Classification Search
CPC ......... H01M 10/0404; H01M 10/0525; H01M 10/0585; H01M 10/049; H01M 10/128; H01M 6/005
(Continued)

(56) References Cited

U.S. PATENT DOCUMENTS

| 5,431,530 A * | 7/1995 | Kobayashi ............. B65G 57/11 198/641 |
| 2013/0125388 A1* | 5/2013 | Loer ..................... B23P 19/008 29/623.1 |
| 2013/0160283 A1* | 6/2013 | Wu .................... H01M 10/0404 29/623.1 |
| 2014/0026398 A1* | 1/2014 | Watanabe ............... B32B 38/18 29/623.1 |

FOREIGN PATENT DOCUMENTS

| JP | 2005-285583 A | 10/2005 |
| JP | 2009-206046 A | 9/2009 |

(Continued)

OTHER PUBLICATIONS

International Search Report (PCT/ISA/210) mailed on Apr. 2, 2013, by the Japanese Patent Office as the International Searching Authority for International Application No. PCT/JP2013/000955.
(Continued)

*Primary Examiner* — Karie O'Neill Apicella
(74) *Attorney, Agent, or Firm* — Buchanan Ingersoll & Rooney PC

(57) ABSTRACT

A stacking apparatus includes a first rotating table that is equipped with a plurality of stacking regions and intermittently rotates the plurality of stacking regions respectively to a plurality of work positions, a first turning unit; and a second turning unit. The first turning unit includes a first arm that turns between the first stacking position and a first pickup position where an anode sheet is picked up and a second arm that turns in concert with movement of the first arm between the first stacking position and a second pickup position where a separator is picked up. The second turning unit includes a third arm that picks up a cathode sheet and
(Continued)

a fourth arm that turns in concert with movement of the third arm and picks up a separator.

8 Claims, 3 Drawing Sheets

(51) Int. Cl.
*B32B 39/00* (2006.01)
*H01M 10/04* (2006.01)
*H01M 10/0525* (2010.01)
*H01M 10/0585* (2010.01)
*B32B 38/18* (2006.01)

(52) U.S. Cl.
CPC ..... *H01M 10/0404* (2013.01); *B32B 38/1858* (2013.01); *B32B 2457/10* (2013.01); *H01M 10/0525* (2013.01); *H01M 10/0585* (2013.01); *Y10T 29/49108* (2015.01); *Y10T 29/53135* (2015.01)

(58) Field of Classification Search
USPC ........................................................ 29/623.1
See application file for complete search history.

(56) References Cited

FOREIGN PATENT DOCUMENTS

| JP | 2010-201593 A | 9/2010 |
| JP | 2012-056648 A | 3/2012 |

OTHER PUBLICATIONS

Written Opinion (PCT/ISA/237) mailed on Apr. 2, 2013, by the Japanese Patent Office as the International Searching Authority for International Application No. PCT/JP2013/000955 (in Japanese).
Notification of Transmittal of Translation of the International Preliminary Report on Patentability (Forms PCT/IB/338 and PCT/IB/373) and the Written Opinion of the International Searching Authority (Form PCT/ISA/237) issued on Feb. 20, 2013, by the International Bureau of WIPO in corresponding International Application No. PCT/JP2013/000955. (5 pages).
Extended European Search Report dated Feb. 27, 2015, issued by the European Patent Office in the corresponding European Application No. 13752419.5. (3 pages).

* cited by examiner

STACKING SYSTEM

TECHNICAL FIELD

The present invention relates to a system of stacking anode sheets, cathode sheets, and separators.

BACKGROUND ART

Japanese Laid-Open Patent Publication No. 2010-201593 discloses the provision of a workpiece conveying method where there is no drop in the operating efficiency of work stations provided in the periphery of a rotating table even when the timing is synchronized with post handling. The work conveying apparatus in such publication includes a rotating table that sends workpieces to a plurality of work stations laid out in the periphery, loading means that loads workpieces onto the rotating table, dispensing means that dispenses workpieces from the rotating table, and control means that controls the loading means to intermittently load workpieces onto the rotating table at workpiece loading reserved positions that are aligned in the circumferential direction and the dispensing means to dispense the loaded workpieces in order.

DISCLOSURE OF THE INVENTION

The electrode structure (stacked electrode) used in a lithium cell or the like is manufactured by stacking a plurality of anode sheets (anode plates) and cathode sheets (cathode plates) with separators in between. There is demand for an apparatus capable of stacking separators, anode sheets, and cathode sheets that has a simple construction, is precise, and operates at high speed.

One aspect of the present invention is a stacking apparatus including: a first rotating table that is equipped with a plurality of stacking regions and intermittently rotates the plurality of stacking regions respectively to a plurality of work positions; a first turning unit that turns so as to overlap a stacking region of the first rotating table that has reached a first stacking position out of the plurality of work positions; and a second turning unit that turns in parallel with the first turning unit so as to overlap a stacking region of the first rotating table that has reached a second stacking position out of the plurality of work positions. The first turning unit includes a first arm that turns between the first stacking position and a first pickup position and a second arm that turns between the first stacking position and a second pickup position in concert with movement of the first arm and places an anode sheet picked up from the first pickup position and a separator picked up from the second pickup position on a layered stack in the stacking region of the first rotating table that has reached the first stacking position. The second turning unit includes a third arm that turns between the second stacking position and a third pickup position and a fourth arm that turns between the second stacking position and a fourth pickup position in concert with movement of the third arm, and places a cathode sheet picked up from the third pickup position and a separator picked up from the fourth pickup position on a layered stack in the stacking region of the first rotating table that has reached the second stacking position.

In this stacking apparatus, the first turning unit and the second turning unit access the first rotating table, which intermittently rotates (i.e., in steps while stopping) the plurality of stacking regions to the plurality of work positions, while turning their respective arms in parallel so as to overlap the stacking regions that have reached predetermined positions (locations) and laminate (stack, layer) an anode sheet or a cathode sheet and a separator at such predetermined positions. Accordingly, in this stacking apparatus, the first and second turning units that carry out circular movement (turning movement) are disposed so as to partially overlap the first rotating table that carries out circular movement and the respective sheets are conveyed while having their angles changed by 90°. This means that the positions where the respective sheets that are usually rectangular are picked up, that is, the first pickup position where an anode sheet is picked up, the second pickup position and the fourth pickup position where separators are picked up, and the third pickup position where a cathode sheet is picked up can be dispersed and laid out at comparatively close positions around the first rotating table. The respective materials can therefore be efficiently moved from the respective pickup positions to the stacking positions and stacked. Accordingly, it is possible to provide a stacking apparatus that is compact and has high productivity.

It is desirable for the first rotating table of the stacking apparatus to include four stacking regions that are disposed at 90° intervals and the first stacking position and the first stacking position are positions of rotationally symmetric. It is possible to dispose the first to fourth pickup positions with high space efficiency around the first rotating table and possible to provide an apparatus that efficiently stacks the anode sheets, the cathode sheets, and the separators using a simple construction.

The first arm and the second arm are perpendicular and the first turning unit turns by 90° so that an anode sheet and a separator are placed on the first stacking position while being rotated by 90 degrees. The third arm and the fourth arm are perpendicular and the second turning unit turns by 90° so that a cathode sheet and a separator are placed on the second stacking position while being rotated by 90 degrees. This means that the first pickup position and the second pickup position, and the third pickup position and the fourth pickup position are disposed in parallel facing each other with the first rotating table in between. This layout is suited to placing the lines that supply the anode sheets, the cathode sheets and the separators to the respective pickup positions in parallel, thereby producing a compact arrangement.

It is desirable for the stacking apparatus to further include a second rotating table that rotates so as to overlap a stacking region of the first rotating table that has reached an unloading position aside from the first stacking position and the second stacking position out of the plurality of work positions and picks up the layered stack in the stacking region of the first rotating table that has reached the unloading position. In addition to the first and second turning units that carry out circular movement (turning movement), it is possible to dispose the second rotating table for unloading purposes that carries out circular movement so as to partially overlap the first rotating table that carries out circular movement. Also, since the layered stack can be unloaded while changing the orientation, it is possible to provide a stacking apparatus that is compact and has high conveying efficiency.

This stacking apparatus may further include a first line that supplies the anode sheets to the first pickup position and a second line that supplies the cathode sheets to the third pickup position. By using the first and second turning units, it is possible to compactly and efficiently connect lines that linearly convey the electrode sheets and the rotating table that carries out circular movement.

Another aspect of the present invention is a method of manufacturing a stacked electrode (electrode stack, layered stack) and a cell that comprises stacking a plurality of anode sheets and cathode sheets with separators in between using a stacking apparatus. The stacking apparatus includes: a first rotating table that is equipped with a plurality of stacking regions and intermittently rotates the plurality of stacking regions respectively to a plurality of work positions; a first turning unit that turns so as to overlap a stacking region of the first rotating table that has reached a first stacking position out of the plurality of work positions, the first turning unit including a first arm that turns between the first stacking position and a first pickup position and a second arm that turns between the first stacking position and a second pickup position in concert with movement of the first arm; and a second turning unit that turns so as to overlap a stacking region of the first rotating table that has reached a second stacking position out of the plurality of work positions, the second turning unit including a third arm that turns between the second stacking position and a third pickup position and a fourth arm that turns between the second stacking position and a fourth pickup position in concert with movement of the third arm.

The stacking in such manufacturing method includes the following steps:

1. the first turning unit placing, at the first stacking position, an anode sheet picked up from the first pickup position and a separator picked up from the second pickup position on a layered stack in the stacking region of the first rotating table that has reached the first stacking position, and
2. the second turning unit placing, at the second stacking position, a cathode sheet picked up from the third pickup position and a separator picked up from the fourth pickup position on a layered stack in the stacking region of the first rotating table that has reached the second stacking position in parallel with the placing at the first stacking position.

By stacking a separator in addition to an anode sheet at the first stacking position and stacking a separator in addition to a cathode sheet at the second stacking position, it is possible to disperse the stacking positions and increase the stacking efficiency and by also stacking a separator at both the first and second stacking positions, it is possible to efficiently manufacture a stacked electrode using a compact stacking apparatus.

DETAIL DESCRIPTION

Figure 1:
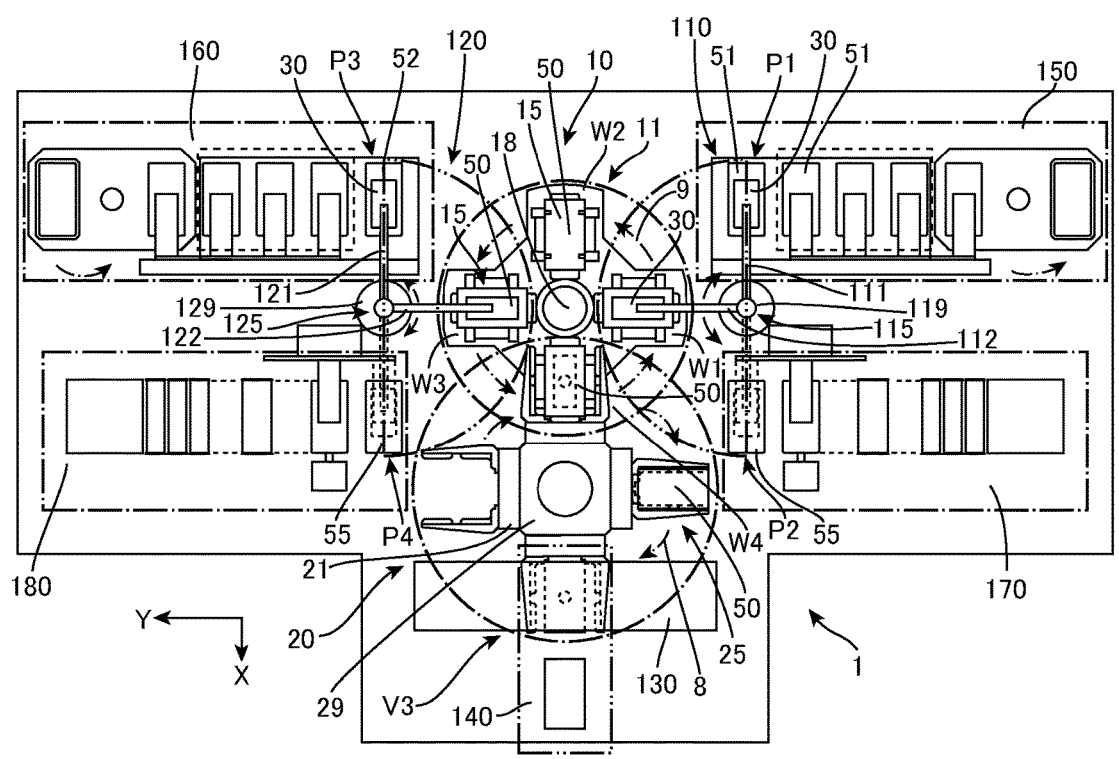
FIG. 1 is a diagram showing the overall layout of a stacking apparatus.

FIG. 1 shows a stacking apparatus that manufactures a stacked electrode (cell) by stacking anode sheets, cathode sheets, and separators. The stacking apparatus 1 includes a cell stacking indexing unit (first rotating table) 10 equipped with a rotating table (first rotating table) 11 that rotates four cell stacking jig portions (stacking regions) 15 with a 90° pitch, a first turning unit 110 equipped with an L-shaped arm 115 that turns so that part of the L-shaped arm 115 overlaps the cell stacking indexing unit 10, a second turning unit 120 equipped with an L-shaped arm 125 that turns so that part of the L-shaped arm 125 overlaps the cell stacking indexing unit 10, and a stacked cell unloading indexing unit (unloading unit) 20 equipped with a rotating table (second rotating table) 21 that rotates so that part of the second rotating table 21 overlaps the cell stacking indexing unit 10 and unloads a cell 50 from the cell indexing unit 10.

The cell stacking indexing unit (hereinafter, "stacking unit") 10 includes a driving unit 18 that intermittently (i.e., in steps while stopping) turns the rotating table 11 with a pitch of 90° in the counter-clockwise direction 9. The rotating table 11 includes the four cell stacking jig portions 15 and the four cell stacking jig portions 15 are rotated by the driving unit 18 in the counter-clockwise direction 9 respectively in order to four positions (work positions) W1 to W4 where operations (work) can be carried out and which exhibit order 4 rotational symmetry (are allocated positions of the four rotationally symmetries). In this stacking apparatus 1, work can be carried out in synchronization or simultaneously at the four work positions W1 to W4. In the stacking apparatus 1, out of the four work positions W1 to W4, the position W1 is a first stacking position where an anode sheet 51 and a separator 55 are stacked on a cell stacking jig portion 15, and the position W3 that has order 2 (two) rotational symmetry with the position W1 (i.e., a position with rotational symmetry, the 180° position) is a second stacking position where a cathode sheet 52 and a separator 55 are stacked on a cell stacking jig portion 15. Out of the four work positions W1 to W4, the position W4 between the first stacking position W1 and the second stacking position W3 is the position W4 where a cell 50 produced by stacking the anode sheets 51 and the cathode sheets 52 with the separators 55 in between is unloaded. Also, out of the four work positions W1 to W4, aside from the first stacking position W1, the second stacking position W3, and the unloading position W4, work is not carried out at the position W2.

The first turning unit 110 includes the first L-shaped arm 115 that turns (in forward and reverse) by 90° in the clockwise direction and the counter-clockwise direction and a driving unit 119 that drives the first L-shaped arm 115. The first L-shaped arm 115 is equipped with a first arm 111 and a second arm 112, with such arms 111 and 112 being combined in an L-shape (so as to be perpendicular) and the first L-shaped arm 115 turning as a whole by 90° (90 degrees) so as to trace a semicircle. Vacuum chucking units 30 are attached to the front ends (leading ends) of such arms 111 and 112 and the first L-shaped arm 115 turns so that the vacuum chucking units 30 attached to such front ends overlap a cell stacking jig portion (stacking region) 15 of the first rotating table 11 that has reached the first stacking position W1. The first arm 111 rotates the vacuum chucking unit 30 at the front end between the first stacking position W1 and a first pickup position P1. The second arm 112 rotates the vacuum chucking unit 30 at the front end between the first stacking position W1 and a second pickup position P2 in concert with movement of the first arm 111.

The first pickup position P1 is a position where the first arm 111 has turned by 90° in the clockwise direction 8 from the first stacking position W1. The second pickup position P2 is a position where the second arm 112 has turned by 90° in the counter-clockwise direction 9 from the first stacking position W1. The first arm 111 picks up an anode sheet 51 at the first pickup position P1 and places (piles up) the anode sheet 51 on the cell 50 in the cell stacking jig portion 15 of the first rotating table 11 that has reached the first stacking position W1. The second arm 112 picks up a separator 55 at the second pickup position P2 and places (piles up) the separator 55 on the cell 50 in the cell stacking jig portion 15 of the first rotating table 11 that has reached the first stacking position W1. The order for placing the anode sheet 51 and the separator 55 may be reversed.

The second turning unit 120 includes the second L-shaped arm 125 that turns (in forward and reverse) by 90° (90 degrees) in the clockwise direction and the counter-clockwise direction and a driving unit 129 that drives the second L-shaped arm 125. The second L-shaped arm 125 is equipped with a third arm 121 and a fourth arm 122, with such arms 121 and 122 being combined in an L-shape (so as to be perpendicular), and the second L-shaped arm 125 turning as a whole by 90° so as to trace a semicircle. Vacuum chucking (pick up) units 30 are attached to the front ends (leading ends) of such arms 121 and 122 and the second L-shaped arm 125 turns so that the vacuum chucking units 30 attached to such front ends overlap a cell stacking jig portion (stacking region) 15 of the first rotating table 11 that has reached the second stacking position W3. The third arm 121 rotates the vacuum chucking unit 30 at the front end between the second stacking position W3 and a third pickup position P3. The fourth arm 122 rotates the vacuum chucking unit 30 at the front end between the second stacking position W3 and a fourth pickup position P4 in concert with (interlocking with) movement of the third arm 121.

The third pickup position P3 is a position where the third arm 121 has turned by 90° in the counter-clockwise direction 9 from the second stacking position W3. The fourth pickup position P4 is a position where the fourth arm 122 has turned by 90° in the clockwise direction 8 from the second stacking position W3. The third arm 121 picks up a cathode sheet 52 at the third pickup position P3 and piles up the cathode sheet 52 on the cell 50 on the cell stacking jig portion 15 of the first rotating table 11 that has reached the second stacking position W3. The fourth arm 122 picks up the separator 55 at the fourth pickup position P4 and piles up the separator 55 on the cell 50 in the cell stacking jig portion 15 that has reached the second stacking position W3. The order for placing the cathode sheet 52 and the separator 55 may be reversed.

The unloading unit 20 includes the unloading table (second rotating table) 21 that rotates in the clockwise direction 8 and a driving apparatus 29. The unloading table 21 includes four cell conveying portions 25 that are disposed at positions with a 90° pitch that exhibit order four rotational symmetry (position of four rotationally symmetries). The respective cell conveying portions 25 each include a conveying support 26 that supports a cell 50 from below and the second rotating table 21 rotates so that the cell conveying portions 25 overlap a cell stacking jig portion (stacking region) 15 of the first rotating table 11 that has reached the unloading position W4. At the unloading position W4, an unloader clamps a cell 50 from above and below so as to transfer the cell 50 from a cell jig portion 15 to a cell conveying portion 25.

The stacking apparatus 1 further includes a tape attaching unit 130, which is disposed at a position (180° position) V3 with order 2 rotational symmetry with respect to the unloading position W4 of the second rotating table 21 of the conveying unit 20, and a conveyor 140 that conveys cells 50 fixed using tape in a downstream direction (X direction).

The stacking apparatus 1 further includes a first supply line 150 that supplies anode sheets 51 to the first pickup position P1, a third supply line 170 that supplies separators 55 to the second pickup position P2, a second supply line 160 that supplies cathode sheets 52 to the third pickup position P3, and a fourth supply line 180 that supplies separators 55 to the fourth pickup position P4. The supply lines 150, 160, 170, and 180 extend in a Y direction that is perpendicular to the X direction. The stacking apparatus 1 has an arrangement in that, as a whole, the anode sheets 51, the cathode sheets 52, and the separators 55 are supplied from the Y direction centered on the stacking unit 10 that includes the first rotating table 11, and the cells 50 produced by stacked such sheets are dispensed in the X direction.

In this stacking apparatus 1, the first turning unit 110 turns by 90° so that an anode sheet 51 and a separator 55 are placed at the first stacking position W1 while being rotated by 90°. The second turning unit 120 that is disposed at a symmetrical position to the first turning unit 110 with the first rotating table 11 in between also turns by 90° so that a cathode sheet 52 and a separator 55 are placed at the second stacking position W3 while being rotated by 90°. Accordingly, both the first pickup position P1 and the second pickup position P2, and the third pickup position P3 and the fourth pickup position P4 are disposed in parallel facing respectively (one another) with the first rotating table 11 in between. This means that the first supply line 150 that supplies the anode sheets 51 to the first pickup position P1 and the third supply line 170 that supplies the separators 55 to the second pickup position P2 can be disposed in parallel in the Y direction. The second supply line 160 that supplies the cathode sheets 52 to the third pickup position P3 and the fourth supply line 180 that supplies the separators 55 to the fourth pickup position P4 can be disposed in parallel in the Y direction. In addition, the first supply line 150 and the second supply line 160 can be symmetrically disposed with the rotating table 11 in between and the third supply line 170 and the fourth supply line 180 can be symmetrically disposed with the rotating table 11 in between.

That is, in the stacking apparatus 1, the anode sheets (anode plates) 51, the cathode sheets (cathode plates) 52, and the separators 55 supplied from the Y direction by the supply lines 150, 160, 170, and 180 are stacked (laminated, piled up, layered) by the first and second turning units 110 and 120 (which turn so as to trace semicircles) in the plurality of cell stacking portions 15 that are rotated by the first rotating table 11 in the stacking unit 10, thereby producing layered stacks (cells) 50, and such cells 50 are unloaded via the second rotating table 21 of the unloading unit 20 by the conveyor 140 in the X direction. Accordingly, it is possible to provide the stacking apparatus 1 that has a simple overall construction, can be made compact, has high space efficiency, and also has high operational efficiency and a short Takt time.

Note that although part of a region where the second rotating table 21 of the unloading unit 20 rotates and the regions where the first and second turning units 110 and 120 turn partially overlap, by having an unloader clamp a cell 50 from above and below and move the cell 50 from a cell stacking jig portion (cell stacking portion) 15 to the cell conveying portions 25 in the up-down direction at the unloading position W4, interference between the second rotating table 21 and the regions where the first and second turning units 110 and 120 turn is prevented in the height direction.

Figure 2:
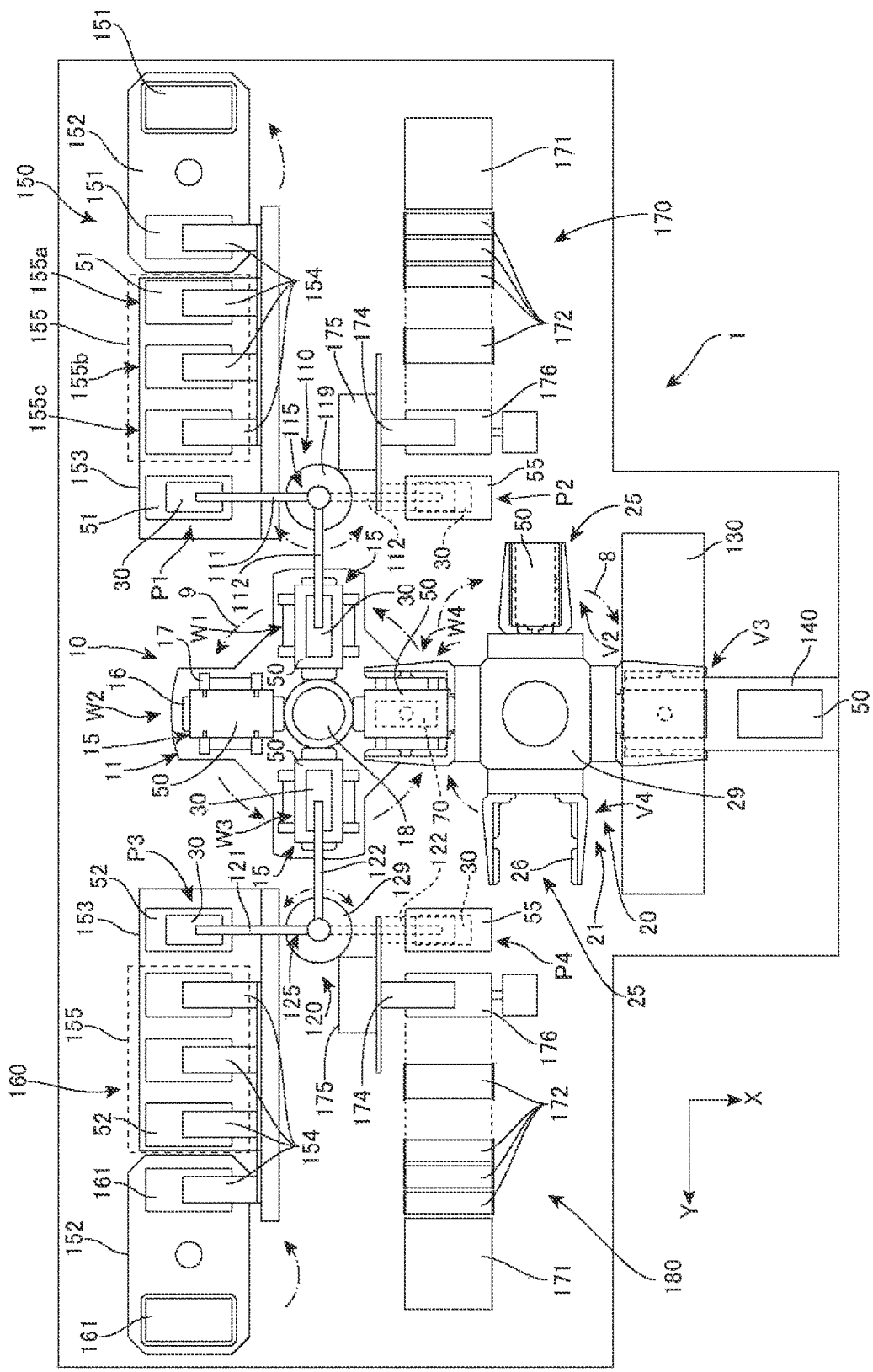
FIG. 2 is a diagram showing the configuration of the stacking apparatus.

FIG. 2 shows an enlargement of the stacking apparatus (laminating apparatus) 1. In this stacking apparatus 1, the anode sheets 51 and the cathode sheets 52 are cut into sheets beforehand and are stored in stockers 151 and 161. The anode sheets 51 and the cathode sheets 52 may be supplied in the form of rolls and cut by the stacking apparatus 1 to produce sheets. The separator 55 is supplied in the form of a roll and roll-type separators 171 are cut by cutters 176 of the supply lines 170 and 180.

One example of the anode sheets 51 is produced by applying an anode activator, which has been produced by mixing an anode active material such as a metal oxide, a conductive material such as carbon black, and an adhesive such as an aqueous dispersion of polytetrafluoroethylene with a weight ratio of 100:3:10, onto both surfaces of metal foil, such as aluminum foil as an anode current collector, drying, rolling, and then cutting to a predetermined size. A lithium complex oxide such as lithium nickel oxide ($LiNiO_2$), lithium manganese oxide ($LiMn_2O_4$), and lithium cobalt oxide ($LiCoO_2$) and a chalcogenide (S, Se, Te) can be given as examples of the anode active material. The anode sheets 51 do not have to be for use in a lithium cell.

One example of the cathode sheets 52 is produced by applying a cathode active material on both surfaces of a cathode current collector metal foil such as nickel foil or copper foil, drying, rolling, and cutting to a predetermined size. A cathode activator is produced by mixing a negative electrode active material, such as graphite amorphous carbon, hardly graphitized carbon or graphitizable carbon, that occludes and releases lithium ions of the anode active material and an aqueous dispersion of styrene-butadiene rubber resin powder as a precursor material for an organic sintered body with a solid content ratio of 100:5 for example, drying, and then grinding to produce a primary material where carbonized styrene-butadiene rubber is held on the surfaces of carbon particles and which is mixed with a binder such as an acrylic resin emulsion with a weight ratio of 100:5.

The separators 55 prevent short circuits between the anode sheets (anode plates, anode layers) 51 and the cathode sheets (cathode plates, cathode layers) 52 described above and may also function so as to hold an electrolyte. As one example, the separators 55 are a microporous film which is composed for example of a polyolefin such as polyethylene (PE) and polypropylene (PP) and has a function whereby when an overcurrent flows, the pores in the film are closed by the resulting heat so as to interrupt the current. The separator 55 is not limited to a single layer film of polyolefin or the like, and it is also possible to use a three-layer structure where a polyethylene layer is sandwiched by polypropylene layers and a laminated structure of a microporous polyolefin film and an organic non-woven fabric.

The configuration of the first supply line 150 that supplies the anode sheets 51 from the anode stockers 151 to the first pickup position P1 and the configuration of the second supply line 160 that supplies the cathode sheets 52 from the cathode stockers 161 to the third pickup position P3 are the same except for having symmetrical layouts. The first supply line 150 will be described here as a representative example. The first supply line 150 includes a stocker switching unit 152 that is capable of switching use between two anode stockers 151 and a feeder unit 153 that feeds anode sheets 51 from a stocker 151 to the first pickup position P1. The feeder unit 153 includes a plurality of vacuum chucking heads 154 that pull the anode sheets 51 by suction and convey such anode sheets 51 to a neighboring position and an alignment unit 155 that corrects the posture of the anode sheets 51.

In the feeder unit 153, a right end vacuum chucking head 154 picks up an anode sheet 51 from a stocker 151 and conveys the anode sheet 51 to an inspection position 155a of the alignment unit 155. At the inspection position 155a, a camera or the like is used to check the position of the picked-up anode sheet 51 in the X direction, the Y direction, and the $\theta$ direction. The second vacuum chucking head 154 picks up the anode sheet 51 at the inspection position 155a and conveys the anode sheet 51 to a posture correcting position 155b. At the posture correcting position 155b, an XY$\theta$ table corrects the position of the anode sheet 51 in the X direction, the Y direction, and the $\theta$ direction based on the posture checked at the inspection position 155a. The third vacuum chucking head 154 picks up the anode sheet 51 at the posture correcting position 155b and conveys the anode sheet 51 to a second inspection position 155c. At the second inspection position 155c, the posture and sheet state of the anode sheet 51 are rechecked and if there is any problem, such anode sheet 51 is removed from the line and the next anode sheet 51 is awaited. The left-end vacuum chucking head 154 picks up the anode sheet 51 at the second inspection position 155c and conveys the anode sheet 51 to the first pickup position P1.

The plurality of vacuum chucking heads 154 of the feeder unit 153 may move in synchronization or asynchronously so that an anode sheet 51 is moved to the next position when it has become possible to move such anode sheet 51 to the next position. By moving the plurality of vacuum chucking heads 154 asynchronously and setting the time (movement Takt time) for feeding to the next position shorter than the time (stacking Takt time) required for stacking by the first turning unit 110, it is possible to suppress the influence on the stacking operation even if there are problems during feeding such that a defected sheet has been found during inspection.

The configuration of the third supply line 170 that supplies the separators 55 to the second pickup position P2 on the anode side and the configuration of the fourth supply line 180 that supplies the separators 55 to the fourth pickup position P4 on the cathode side are the same except for having symmetrical layouts. The third supply line 170 will be described here as a representative example. The third supply line 170 includes the roll 171 into which a strip-like separator 55 is wound, a plurality of rollers 172 that apply appropriate tension to pull the separator 55 out from the roll 171, the cutter 176 that cuts the pulled-out strip-like separator 55 into predetermined sizes, and a feeder unit 175 that conveys sheet-like separators 55 from the cutter 176 to the second pickup position P2. The feeder unit 175 includes a vacuum chucking head 174 and successively conveys the sheet-like separators 55 cut by the cutter 176 to the second pickup position P2.

The cutter 176 includes, for example, a drum in the form of a rectangular solid. The respective circumferential surfaces of the drum in the form of a rectangular solid have a function of vacuum chucking (pulling by suction) the separator 55 and by rotating the drum, the separator 55 is pulled out from the roll 171. After this, by cutting the separator 55 at the corners of the circumferential surfaces, it is possible to supply sheet-like separators 55 of a predetermined size. Such a cutter is disclosed for example in Japanese Laid-Open Patent Publication No. 2005-50583.

The first turning unit 110 that picks up an anode sheet 51 and a separator 55 and supplies such materials to the cell stacking portion 15 at the first stacking position W1 is an L-shaped indexing unit (rotating table) and includes the L-shaped arm 115 that is constructed so that the first arm 111 and the second arm 112 are perpendicular. The vacuum chucking heads (suction pulling heads) 30 are provided at the front ends of the respective arms 111 and 112 and the anode sheet 51 and the separator 55 can be conveyed while being pulled by suction. The first arm 111 repeatedly moves (turns, rotates) the head 30 at the front end between the first pickup position P1 and the first stacking position W1. The second arm 112 repeatedly moves (turns, rotates) the head 30 at the front end between the first stacking position W1 and the second pickup position P2 in concert with movement of the first arm 111.

Accordingly, if the L-shaped arm 115 moves (rotates forward) by 90° in the clockwise direction and moves (rotates in reverse) by 90° in the counter-clockwise direction, it is possible to supply an anode sheet 51 and a separator 55 to the cell stacking jig portion 15 that has reached the first stacking position W1. This means that it is possible to stack an anode sheet 51 and a separator 55 onto the cell 50 in the cell stacking portion 15 at the first stacking position W1. Note that forward rotation and rotation in reverse may be the opposite directions and the order in which the anode sheet 51 and the separator 55 are supplied to the first stacking position W1 may be reversed.

The second turning unit 120 that picks up the cathode sheet 52 and the separator 55 and supplies such materials to the cell stacking portion 15 at the second stacking position W3 is disposed with left/right symmetry with respect to the first turning unit 110. The second turning unit 120 is also an L-shaped indexing unit (rotating table) and includes the L-shaped arm 125 that is constructed so that the third arm 121 and the fourth arm 122 are perpendicular. The vacuum chucking heads (suction pulling heads) 30 are provided at the front ends of the respective arms 121 and 122 and the cathode sheet 52 and the separator 55 can be conveyed while being pulled by suction. The third arm 121 repeatedly rotates the head 30 at the front end between the third pickup position P3 and the second stacking position W3 and the fourth arm 122 repeatedly rotates the head 30 at the front end between the second stacking position W3 and the fourth pickup position P4 in concert with movement of the fourth arm 122.

Accordingly, if the L-shaped arm 125 rotates forward and rotates in reverse, it is possible to supply a cathode sheet 52 and a separator 55 to the cell stacking portion 15 that has reached the second stacking position W3. This means that it is possible to stack a cathode sheet 52 and a separator 55 onto the cell 50 in the cell stacking portion 15 at the second stacking position W3. Note that forward rotation and rotation in reverse may be the opposite directions and the order in which the cathode sheet 52 and the separator 55 are supplied to the second stacking position W3 may be reversed.

The stacking unit 10 includes the rotating table 11 on which the cell stacking portions (cell stacking jig portions) 15 are mounted in four directions and by intermittently rotating the rotating table 11 in the counter-clockwise direction 9, the cell stacking portions 15 are successively moved to the work positions W1 to W4 that exhibit order 4 rotational symmetry. Each cell stacking portion 15 includes a stacking table 16 that forms a region (stacking region) where the anode sheets 51 and the cathode sheets 52 are successively piled up (layered, laminated) with the separators 55 in between and clamps (stoppers) 17 that temporarily hold the stacked sheets.

The clamps 17 are disposed so as to press the four corners of a sheet or positions close to the four corners from above. The clamps 17 open when an anode sheet 51, a cathode sheet 52, and a separator 55 has been placed on the stacking table 16 by the first and second turning units 110 and 120, that is, when a vacuum chucking head 30 is lowered, and the clamps 17 close (press) when the vacuum chucking head 30 is raised so that when a placed sheet 51, 52, or 55 is separated from a vacuum chucking head 30, the state of the sheets 51, 52, and 55 is stabilized while the cell stacking portion 15 is moving.

The unloading unit 20 picks up a cell 50, in which the anode sheets 51 and the cathode sheets 52 have been stacked with the separators 55 in between for a predetermined number of layers (times), from the unloading position W4 and conveys the cell 50 to a post-handling unit 130. The unloading unit 20 includes the rotating table 21 on which the cell conveying portions 25 are mounted in four directions and by intermittently rotating the second rotating table 21 with a pitch of 90° in the clockwise direction 8, the cell conveying portions 25 are moved to the positions V1 to V4 that exhibit order 4 rotational symmetry. The position V1 that overlaps the rotating table 11 of the cell stacking unit 10 is a position where the cell 50 is picked up from the fourth position W4, with the unloader 70 that grabs the cell 50 from above and below and moves the cell 50 from the fourth position W4 to the position V1 that are separated in the up-down direction being disposed at such position.

When the cell 50 has been grabbed from above and below and raised from the position W4 by the unloader 70, claws (unloading supports) 26 of a cell conveying portion 25 are closed at the position V1 to support the cell 50 from below so as to convey the cell 50 from the stacking unit 10 to the conveying unit 20. The cell conveying portion 25 conveys the cell 50 from the position V1 via the position V2 to the position V3 on the opposite side (with order 2 rotational symmetry, or 180° symmetry) to the position V1. At the position V3, the tape attaching unit 130 clamps a cell 50 on the cell conveying portion 25 from above and below to remove the cell 50 and winds tape around the cell 50 to fix the cell 50.

The fixed cell 50 is conveyed by the cell conveying conveyor 140 that extends from the tape attaching unit 130 in the X direction so as to be removed from the stacking apparatus 1.

Figure 3:
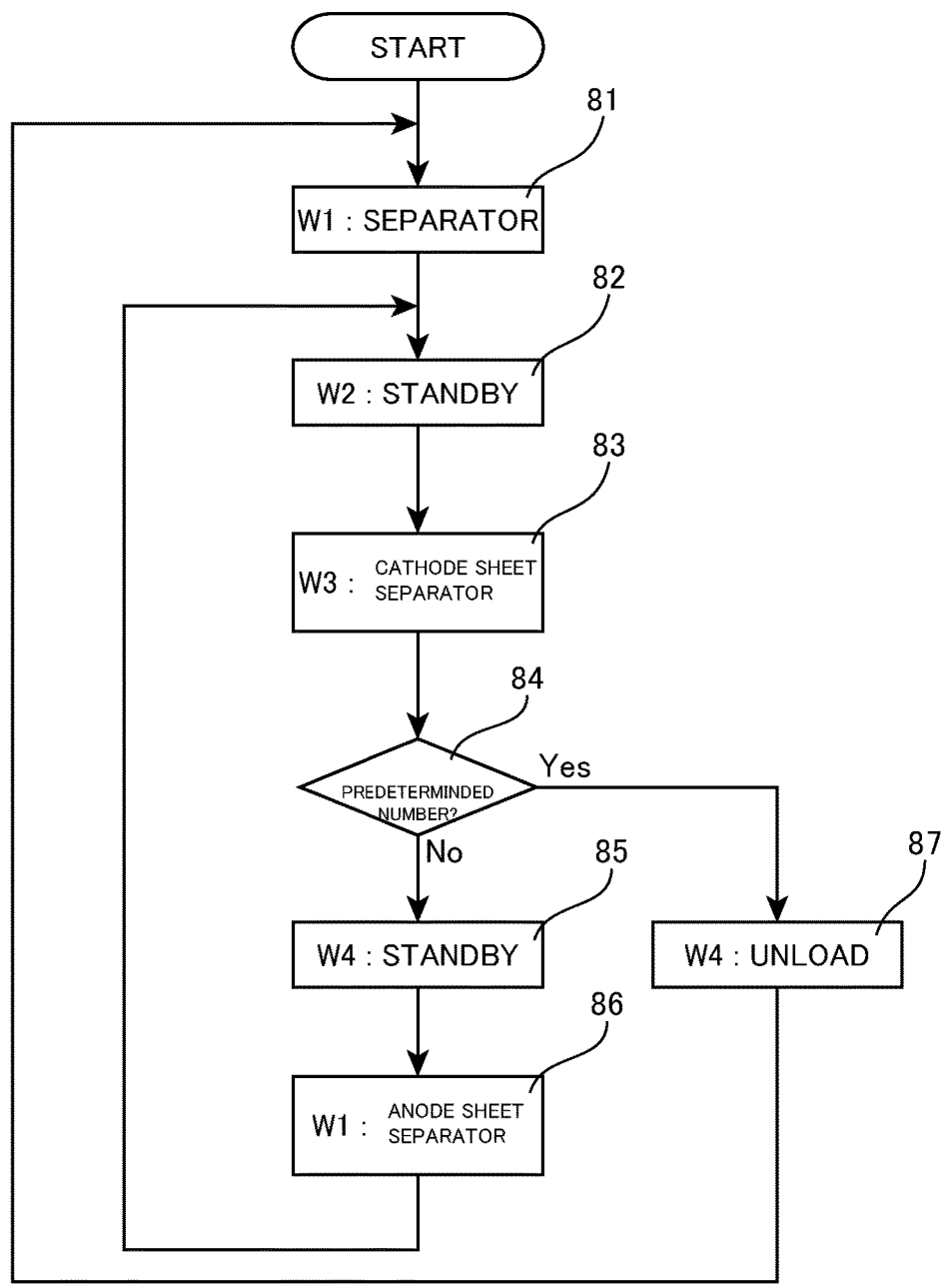
FIG. 3 is a flowchart showing a procedure for manufacturing a cell using the stacking apparatus.

FIG. 3 shows the operation of the stacking apparatus 1 focusing on one cell stacking portion 15. This example shows a case where the cell 50 where both side surfaces are constructed of a separator 55 and a cathode sheet 52 is manufactured as the stacked electrode (electrode stack, electrode structure, electrode assembly) of a lithium battery. The stacking apparatus 1 is program controlled by a control unit (not shown) equipped with a memory and a CPU.

When the manufacturing of a cell 50 starts, in step 81, a cell stacking portion 15 is moved to the first work position (first stacking position) W1 by the rotating table 11 of the stacking unit 10. At the first stacking position W1, as an initial process, only a separator 55 is supplied to the cell stacking portion 15 by the first turning unit 110. Although the cell stacking portion 15 moves to the second work position W2 at the next timing (i.e., in the next movement period), in this stacking apparatus 10 work is not carried out at the second work position W2 (step 82). In the next movement period, the cell stacking portion 15 moves to the third work position (second stacking position) W3, a cathode sheet 52 and a separator 55 are supplied by the second turning unit 120, and the cathode sheet 52 and the separator 55 are stacked on the cell 50 (step 83).

The cell stacking portion 15 moves to the fourth work position (unloading position) W4 in the next movement cycle and it is determined in step 84 whether a predetermined number (combination) of the cathode sheets 52 and the anode sheets 51 have been stacked with the separators 55 in between. When further stacking is necessary, in step 85, work is not carried out at the fourth work position W4 and in the next movement period the cell stacking portion 15 moves to the first work position (first stacking position) W1 (step 86). At the first stacking position W1, an anode sheet 51 and a separator 55 are supplied to the cell stacking portion 15 by the first turning unit 110 so that the anode sheet 51 and the separator 55 are stacked in that order on the cell 50 in the cell stacking portion 15.

When the above steps have been repeated and it is determined in step 84 that a cell 50 in which a predetermined number of the anode sheets 51, the cathode sheets 52, and the separators 55 have been stacked has been manufactured, in step 87 the cell 50 is unloaded from the fourth work position W4 by the unloading unit 20.

By carrying out the above steps, in the stacking apparatus 1, four cells 50 are manufactured in a pipeline by the stacking apparatus 1 so that cells are successively manufactured in a cycle at intervals of the movement period t1. For the movement period t1, the time taken by the first turning unit 110 and the second turning unit 120 to supply an anode sheet 51 or a cathode sheet 52 and a separator 55 at the first stacking position W1 and the second stacking position W3 (i.e., the stacking Takt time) is the critical path. The first turning unit 110 and the second turning unit 120 use the L-shaped arms 115 and 125 so that the picking up and supplying (stacking) of sheets can be carried out simultaneously in parallel. This means that it is possible to supply an anode sheet 51, a cathode sheet 52, and separators 55 in the time taken by the respective L-shaped arms 115 and second L-shaped arm 125 to make one cyclical movement, that is, the time taken to rotate forward and in reverse. Accordingly, although an anode sheet 51 and a separator 55 are stacked at the first stacking position W1 and a cathode sheet 52 and a separator 55 are stacked at the second stacking position W3, the movement period t1 of the rotating table 11 may be synchronized with the movement periods of the L-shaped arms 115 and 125 so that the first rotating table 11 can be rotated at high speed and the manufacturing interval of the cells 50 can be reduced.

In the stacking apparatus 1, an anode sheet 51 and a separator 55 are stacked at the first stacking position W1 out of the four positions W1 to W4 of the rotating table 11 and in parallel a cathode sheet 52 and a separator 55 are stacked at the second stacking position W3. This means that a remaining position W4 can be dedicated to use for unloading. Accordingly, it is possible to simplify the construction of the stacking apparatus 1 and to increase the freedom for laying out the stacking apparatus 1. As one example, in the stacking apparatus 1, since it is sufficient for the first rotating table 11 to stop at a minimum of three positions, it is also possible to lay out the three positions at a pitch of 120°. However, since the first and second turning units 110 and 120 will not be disposed in a straight line, there is conversely the possibility of a fall in the space efficiency of the stacking apparatus 1. Also, although work is not carried out at the second stacking position W2, such position has merits in acting to lengthen the pipeline and acting as a buffer that increases the number of cells 50 manufactured with the interval t1.

It is also possible to increase the stopping positions of the rotating table 11 to five positions or more, to lengthen the pipeline, and to further increase the number of cells 50 manufactured with the interval of period t1. In such case, to increase the effective manufacturing efficiency, it is desirable to make the rotating table larger and to increase the number of first turning units 110 and second turning units 120, which makes the stacking apparatus larger.

In the stacking apparatus 1, the first turning unit 110 and the second turning unit 120 access the first rotating table 11, which intermittently rotates the plurality of cell stacking portions (stacking regions) 15 to the plurality of work positions W1 to W4, while turning the respective L-shaped arms 115 and 125 so as to overlap the stacking regions at the work positions W1 and W3 and stack an anode sheet 51 or a cathode sheet 52 and a separator 55 at the respective work positions W1 and W3. In the stacking apparatus 1, the first and second turning units 110 and 120 that carry out circular movement (turning movement) are disposed so as to partially overlap the first rotating table 11 that carries out circular movement and the rectangular anode sheets 51, cathode sheets 52, and separators 55 are conveyed while having their orientations changed by 90°.

Accordingly, the first pickup position P1 where an anode sheet 51 is picked up, the second pickup position P2 and the fourth pickup position P4 where separators are picked up, and the third pickup position P3 where a cathode sheet 52 is picked up are dispersed and laid out at comparatively close positions around the first rotating table 11. By such arrangement, the anode sheets 51, the cathode sheets 52, and the separators 55 are efficiently moved from the respective pickup positions P1 to P4 to the stacking regions 15 on the first rotating table 11 and stacked. Accordingly, it is possible to provide the stacking apparatus 1 that is compact and has high productivity.

In addition, the stacking apparatus 1 includes the unloading unit 20 that includes the second rotating table 21 that rotates so as to overlap the stacking region 15 of the first rotating table 11 that has reached the unloading position W4 and picks up the cell (layered stack, stacked electrode) 50 in the stacking region 15 that has reached the unloading position W4. By disposing the second rotating table 21 for unloading purposes that carries out circular movement so as to partially overlap the first rotating table 11 that carries out circular movement, it is possible to make the stacking apparatus 1 as a whole compact, including the unloading unit 20. Since it is also possible to set the rotational direction so that the first rotating table 11 and the second rotating table 21 construct a gear train and unload the cells 50 while changing the orientations of the cells 50, it is easy to avoid interference between the mechanisms of the respective rotating tables and to provide a stacking apparatus with favorable unloading efficiency.

Also in the stacking apparatus 1, the first and second turning units 110 and 120 for loading purposes that turn and the second rotating table 21 for unloading that rotates are disposed around the first rotating table 11 that is the center of the stacking process. By using such layout, loading and unloading lines disposed so as to be linear, that is, the first supply line 150 that supplies the anode sheets, the second supply line 160 that supplies the cathode sheets, the third and fourth supply lines 170 and 180 that supply the separators and also the conveyor 140 that unloads the stacked cells 50, and the first rotating table 11 are connected in a compact space.

In addition, in the stacking apparatus 1, the plurality of linear supply lines 150 to 180 are disposed in I-shapes with 180° symmetry about the rotating table 11 of the stacking unit 10, the conveyor 140 is disposed in a direction perpendicular to such, and a design that occupies an overall T shape but is close to an I shape is realized. Accordingly, the stacking apparatus 1 has high space efficiency and can be laid out in a comparatively narrow space. Also, by disposing a plurality of stacking apparatuses 1 in parallel, it is possible to further increase the manufacturing efficiency of the cells 50.

Note that although an example where a stacked electrode (cell) 50 for a lithium ion cell is manufactured by the stacking apparatus 1 has been described above, the stacking apparatus 1 is favorable for manufacturing batteries that includes a stacked electrode without being limited to lithium ion batteries.

The invention claimed is:

1. A stacking apparatus comprising:
a first rotating table that is equipped with a plurality of stacking regions and intermittently rotates the plurality of stacking regions respectively to a plurality of work positions;
a first turning unit that turns so as to overlap a stacking region of the first rotating table that has reached a first stacking position out of the plurality of work positions; and
a second turning unit that turns in parallel with the first turning unit so as to overlap a stacking region of the first rotating table that has reached a second stacking position out of the plurality of work positions,
wherein the first turning unit includes a first arm that turns between the first stacking position and a first pickup position and a second arm that turns between the first stacking position and a second pickup position in concert with movement of the first arm, and places an anode sheet picked up from the first pickup position and a separator picked up from the second pickup position on a layered stack in the stacking region of the first rotating table that has reached the first stacking position, and
the second turning unit includes a third arm that turns between the second stacking position and a third pickup position and a fourth arm that turns between the second stacking position and a fourth pickup position in concert with movement of the third arm, and places a cathode sheet picked up from the third pickup position and a separator picked up from the fourth pickup position on a layered stack in the stacking region of the first rotating table that has reached the second stacking position.

2. The stacking apparatus according to claim 1,
wherein the first rotating table includes four stacking regions that are disposed at 90° intervals and the first stacking position and the second stacking position are positions of rotationally symmetric.

3. The stacking apparatus according to claim 1,
further comprising a second rotating table that rotates so as to overlap a stacking region of the first rotating table that has reached an unloading position aside from the first stacking position and the second stacking position out of the plurality of work positions and picks up the layered stack in the stacking region of the first rotating table that has reached the unloading position.

4. The stacking apparatus according to claim 1,
further comprising a first line that supplies anode sheets to the first pickup position and a second line that supplies cathode sheets to the third pickup position.

5. The stacking apparatus according to claim 1, wherein:
the turning of the first turning unit is a rotation;
the turning of the second turning unit is a rotation;
the turning of the first arm is a rotation;
the turning of the second arm is a rotation;
the turning of the third arm is a rotation; and
the turning of the fourth arm is a rotation.

6. The stacking apparatus according to claim 5,
wherein the first rotating table includes four stacking regions that are disposed at 90° intervals and the first stacking position and the second stacking position are positions of rotationally symmetric.

7. The stacking apparatus according to claim 6,
wherein the first arm and the second arm are perpendicular and the first turning unit rotates by 90 degrees so that an anode sheet and a separator are placed on the first stacking position while being rotated by 90 degrees,
the third arm and the fourth arm are perpendicular and the second turning unit turns by 90 degrees so that a cathode sheet and a separator are placed on the second stacking position while being rotated by 90 degrees, and
the first pickup position and the second pickup position, and the third pickup position and the fourth pickup position are disposed in parallel facing each other with the first rotating table in between.

8. A method of manufacturing a stacked electrode comprising stacking a plurality of anode sheets and cathode sheets with separators in between by a stacking apparatus,
the stacking apparatus including:
a first rotating table that is equipped with a plurality of stacking regions and intermittently rotates the plurality of stacking regions respectively to a plurality of work positions;
a first turning unit that rotates so as to overlap a stacking region of the first rotating table that has reached a first stacking position out of the plurality of work positions; and
a second turning unit that rotates so as to overlap a stacking region of the first rotating table that has reached a second stacking position out of the plurality of work positions,
wherein the first turning unit includes a first arm that rotates between the first stacking position and a first pickup position and a second arm that rotates between the first stacking position and a second pickup position in concert with movement of the first arm,
the second turning unit includes a third arm that rotates between the second stacking position and a third pickup position and a fourth arm that rotates between the second stacking position and a fourth pickup position in concert with movement of the third arm,
and the stacking comprises:
the first turning unit placing, at the first stacking position, an anode sheet picked up from the first pickup position and a separator picked up from the second pickup position on a layered stack in the stacking region of the first rotating table that has reached the first stacking position, and
the second turning unit placing, at the second stacking position, a cathode sheet picked up from the third pickup position and a separator picked up from the fourth pickup position on a layered stack in the stacking region of the first rotating table that has reached the second stacking position in parallel with the placing at the first stacking position.

* * * * *